United States Patent [19]
Domaingue, Jr.

[11] 3,977,069
[45] Aug. 31, 1976

[54] PROCESS AND APPARATUS FOR PRODUCTION OF PRECISION CUT LENGTHS OF METAL WIRES AND FIBERS

[75] Inventor: George Hector Domaingue, Jr., Milford, Conn.

[73] Assignee: Brunswick Corporation, Skokie, Ill.

[22] Filed: Dec. 18, 1974

[21] Appl. No.: 533,988

[52] U.S. Cl. ............................ 29/424; 29/423; 29/417; 83/15; 83/22; 83/170; 83/402; 83/913; 156/80; 156/155; 156/181; 156/250
[51] Int. Cl.² ............................ B23P 17/04
[58] Field of Search ............ 29/423, 424, 412, 411, 29/417, 419; 156/155, 181, 250, 80; 83/15, 16, 22, 342, 170, 23, 402, 27, 913

[56] References Cited
UNITED STATES PATENTS

| | | | |
|---|---|---|---|
| 2,296,298 | 9/1942 | Spalding et al. | 83/402 X |
| 2,719,336 | 10/1955 | Stotler | 83/23 X |
| 2,729,028 | 1/1956 | Slayter et al. | 83/913 X |
| 2,745,491 | 5/1956 | Sonneborn et al. | 83/913 X |
| 2,808,884 | 10/1957 | Shann et al. | 83/913 X |
| 3,164,047 | 1/1965 | Spicer et al. | 83/913 X |
| 3,247,589 | 4/1966 | Burns | 29/424 |
| 3,333,498 | 8/1967 | Holm | 83/342 X |
| 3,673,048 | 6/1972 | Gidge et al. | 156/510 |

*Primary Examiner*—Victor A. DiPalma
*Attorney, Agent, or Firm*—John G. Heimovics; David S. Guttman

[57] ABSTRACT

This invention contemplates a method and apparatus for taking fine metal fibers having a diameter range from .5 microns to approximately 150 microns and cutting the fibers into precise short lengths. The method and apparatus utilized first moistening tows of metal fibers, unwinding the tows from spools and positioning them into tow bands, stiffening the ribbon made from the tow bands, and cutting the fibers to desired precise lengths in order to prevent cold welding or deformation of the ends of the fibers during the cutting operation. Materials that may be used for stiffening the fibers include starch, PVA, ice, etc.

30 Claims, 5 Drawing Figures

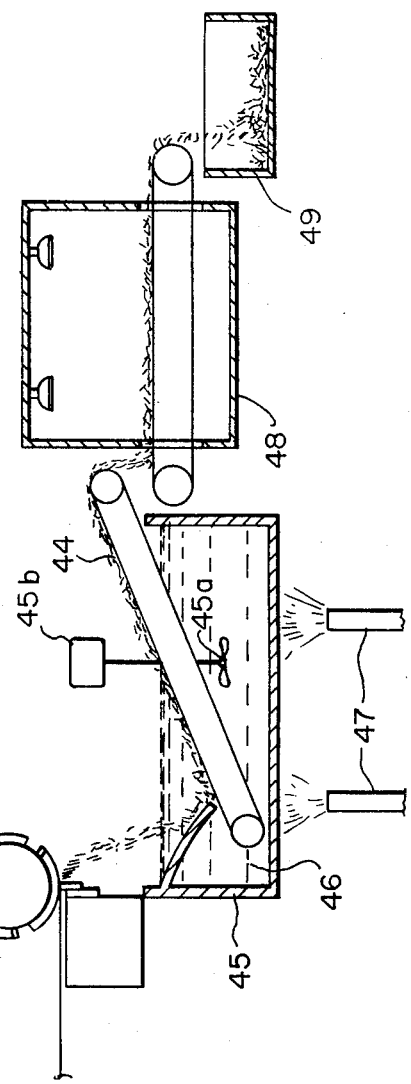
FIG. 4
FIG. 5
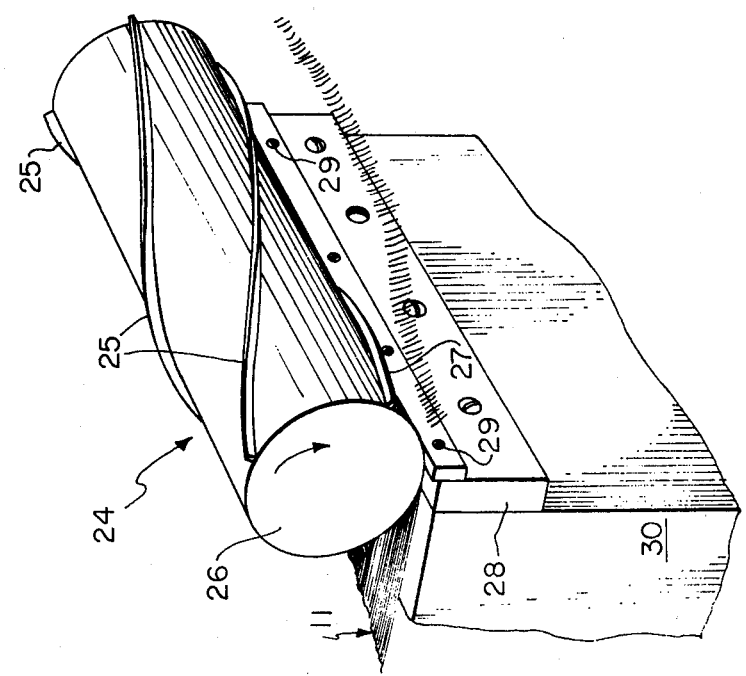
FIG. 2

3,977,069

PROCESS AND APPARATUS FOR PRODUCTION OF PRECISION CUT LENGTHS OF METAL WIRES AND FIBERS

BACKGROUND OF THE INVENTION

1. Field of the Invention

This invention relates to the formation of precision cut lengths of metal wires or fibers having very small diameters, and to the apparatus for producing the same.

2. Description of Prior Art

While there is a significant body of patent art relating to the cutting of elongated filaments of natural, organic synthetic fibers and fiber glass to shorter lengths, no patents have been found which show the precision cutting of fine diameter metal wires or fibers to predetermined short lengths. U.S. Pat. Nos. 2,093,415; 2,278,032; 3,673,027; and 3,731,578 are cited as illustrative of the former class of patents. However owing to the lack of sufficient rigidity, the metal fibers employed in the instant process cannot be cut in the desired lengths using the methods taught in the prior art.

SUMMARY OF THE INVENTION

This invention relates to the production of precision cut lengths of metal wires or fibers, produced from metal tow and involves forming a ribbon of two bands laid up side by side to form a ribbon, stiffening said ribbon and feeding it to a cutter where it is cut up into the desired lengths.

OBJECTS OF THE INVENTION

It is an object of this invention to provide a method and apparatus for the precision cutting of small diameter wires and fibers, preferably ranging in diameter from 0.5 to 150 microns, into predetermined lengths, and without cold welding or metal deformation of the cut ends to permit total individual fiber separation.

It is a further object of this invention to form a ribbon of metal tow bands and to stiffen said tow bands preparatory for further treatment steps.

It is a further object of this invention to stiffen the ribbon of tow bands by applying a solution of stiffening agent thereto and removing the solvent.

It is a further object of the invention to stiffen the ribbon of tow bands by passing it through a venturi together with an air blast.

It is a feature of the invention to prepare the ribbon from tow bands which are unwound from spools of tow, which are kept wet to avoid fly (short loose uncontrolable wire or fiber) and to prevent entanglements.

It is a further feature of the present invention to stiffen the ribbon by first saturating it with water and then passing it through a freezing zone.

It is a further feature of this invention to provide for cutting the fibers with a helically ground rotating knife which cuts with a shearing action against a stationary bed knife.

It is further feature of this invention to remove any stiffening agent from the cut ribbon length, whereby the individual cut fibers are released.

Further objects and features of this invention will become apparent from the following specification and claims.

DESCRIPTION OF THE DRAWING

FIG. 2 is an isometric view of the cutter blade structure;

FIG. 4 is a schematic view in section of another embodiment of the invention; and FIG. 5 is a view in section of washing and drying means which may be employed with FIG. 1.

DETAILED DESCRIPTION OF THE PREFERRED EMBODIMENT

A major problem in the cutting of fine diameter wire or fibers is that the stiffness or rigidity characteristics decrease as the diameter decreases. As used herein, the terms metal fiber, metal filament, metal wire, wire, filament or fiber are used interchangeable and means wire, fiber or filament having a diameter ranging from about 0.5 microns (or less) to about 150 microns in diameter or effective diameter (if the wire, fiber or filament does not have a circular cross-section). The term "tow" as used herein means a plurality (two or more) of fibers, filaments or wires in a parallel array. This diminishes the amount of pushing force that can be applied to the fibers to control and move them in a straight and uniform motion toward a cutting section. For precision cutting, the factors governing are the clearances of the cutting knives, the stiffness of the fibers, the thickness of the groups of fibers and the length. As the ratio of unsupported length to diameter increases, the fibers become more limp and uncontrollable, and the clearances of the cutting knives become more exacting. This invention increases the rigidity of the fibers during the cutting operation, so that precision cutting may be effected.

Figure 1:
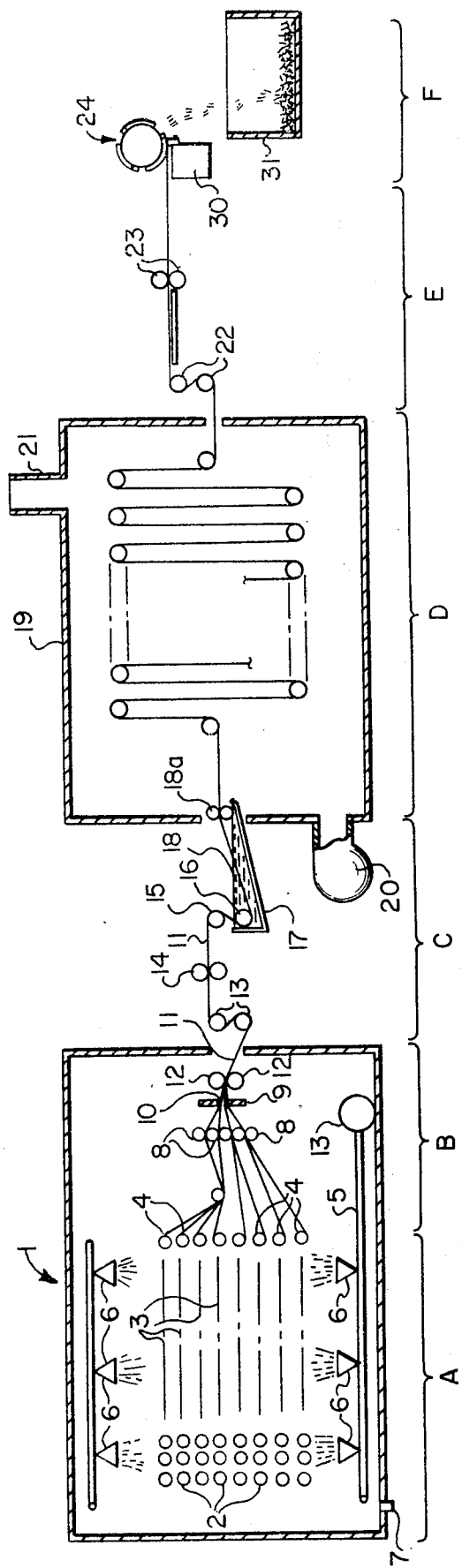
FIG. 1 is a sectional view of one embodiment of the invention.

In FIG. 1, one embodiment of the invention is shown, comprising a pay-off area Station A; a tension compensator target area Station B; a coating area Station C; a drying and curing area Station D; a tension compensator feed roll Station E; and a cutting Station F.

In Station A, reference numeral 1 is a creel containing a plurality of spools (2) of wires or metal fiber tow. Such metal fiber tow and the method for making it is described for example in U.S. Pat. Nos. 3,277,564; 3,378,999; and 3,394,213, assigned to Brunswick Corporation. Typically, a creel is set up with 240 spools of tow, but this may be varied as needed. Five pound spools have been found useful, but they may be of any convenient weight.

Initial tow bands 3 are formed from the tows unwound from the spools 2 and are fed over guides 4 to Station B to be described hereinafter. As spools of tow get depleted, they are replaced by new spools and the new tow ends are attached to adjacent tow bands to guide them through the processing equipment. In order to avoid fly and entanglement of the fibers in the guides, creel 1 is enclosed and all the spools are kept wet with a fine spray of water introduced via water line 5 and spray heads 6. Sufficient head for this purpose is furnished by pump 13. A drain 7 is provided to remove excess water.

In Station B, the tow bands are passed over tension compensator rolls 8 and pass through target plate 9 having a rectangular opening 10 through which the tow bands pass and are laid up in the form of a continuous ribbon 11. Rolls 12 aid in moving the ribbon 11 to the next Station C. In one example for 8 micron filaments, each tow has a weight of 0.12 grams/foot, and when all tow bands are guided into a ribbon, a 4½ inch wide 0.012' thick continuous ribbon weighing 28.8 grams/lineal foot is produced.

Ribbon 11 leaves Station B and passes over guide rolls 13,13 through feed rolls 14,14 and guide rolls 15,16 into sizing or binder tank 17. Tank 17 containing a liquid binder 18 which saturates the fiber ribbon. Pinch rolls 18a remove excess binder liquid 18 and the ribbon then passes into Station D for drying and/or curing. As stated previously, the binder or sizing provides the necessary stiffness to permit the precision cutting step. Any material which can be easily applied and removed and which forms a coating which imparts the necessary stiffness may be employed. Among these are starch dispersions, solutions of various gums and resins, etc. A water solution of polyvinyl alcohol of about 13% has been found to be satisfactory. It is important that the tow bands forming the ribbon be loose and permeable, i.e. having less than one twist per inch and the thickness of the ribbon be preferably less than 0.020 inch to permit complete permeation of the PVA solution into the interstices between the individual fibers. Ribbon thickness of 0.012 to 0.018 have been found desirable.

After leaving the binder tank 17, the binder treated ribbon passes to Station D. Here in curing oven 19, solvent is removed from the binder solution by heat supplied by any convenient means such as resistance coils or gas burners, and with circulating air admitted by fan structure 20 and exhausted through 21. As shown in FIG. 1, the ribbon is looped over a series of rollers through the curing oven and leaves the oven to pass to Station E.

At this stage the binder permeates the ribbon and acts to stiffen it to permit continuous spooling and fiber cutting. In Station E, the ribbon passes over guide rolls 22 through tension compensator feed rolls 23 into the cutter Station F. Here the ribbon is cut to the desired size by a cutter means 24 mounted on support 30 consisting of an upper rotating knife contacting a lower stationary bed knife. As shown in FIG. 2, the upper knife structure consists of a plurality of blades 25 angularly mounted on rotor 26. However, if desired a single blade may be employed. The lower stationary knife structure 27 is mounted on a bed 28 and is attached thereto by adjusting and fastening screws 29.

The upper and lower knives have equal wear qualities that permit maintaining extremely close tolerances between all cutting edges within millionths of an inch. The lower stationary knife can be precisely adjusted to allow for any grinding deviations of the fly knives and to assure precision clearance for all cutting edges.

Best results are obtained when the rotating knives are mounted at an angle to the bed knife as shown, so that only one point of a rotating knife is in contact with the stationary bed knife at any one time. This permits shear rather than impact cutting. After mounting the desired number of knives (one or more) on the supporting rotor, these are helically ground. Thereafter the rotor is mounted on the cutting machine, and is precisely lapped with the bed knife 27 by lapping with diamond grit lapping compound.

After passing through the cutting knives, the severed ribbon sections fall into bin 31. The length of the fibers is determined by the spacing of the knives on the knife rotor, the speed of ribbon feed and the rotational velocity of the knife rotor. Varying one or more of these parameters will change the length of the cut fiber produced.

To separate the ribbon sections into individual fibers they are soaked in a solvent for the binder and then removed and dried. In the case of the PVA binder, the sections are soaked in hot water to dissolve the PVA and the resulting solution can be distilled to recover the PVA which can then be recycled for use in the coating step.

In FIG. 5, one embodiment is shown for dissolving the PVA and drying the fibers. The cut ribbon section drops from the cutter means 24 onto a moving belt 44 in tank 45 having water 46 therein. The tank is heated by any convenient means such as gas heater 47. It has been found desirable in certain circumstances to cause constant or cycle agitation of the water 46 in tank 45 to assist in removing the PVA from the cut fiber ribbons. This may be accomplished by a number of suitable means such as a beater 45a which is driven by motor 45b. The hot water dissolves the PVA from the cut ribbons, and the latter separate into individual fibers. Fibers fall onto moving belt, which passes through a drying chamber 48, and the dried fibers fall into container 49. Fresh water can be continuously added to tank 45 and PVA solution removed for treatment, either periodically or continuously as desired.

Figure 3:
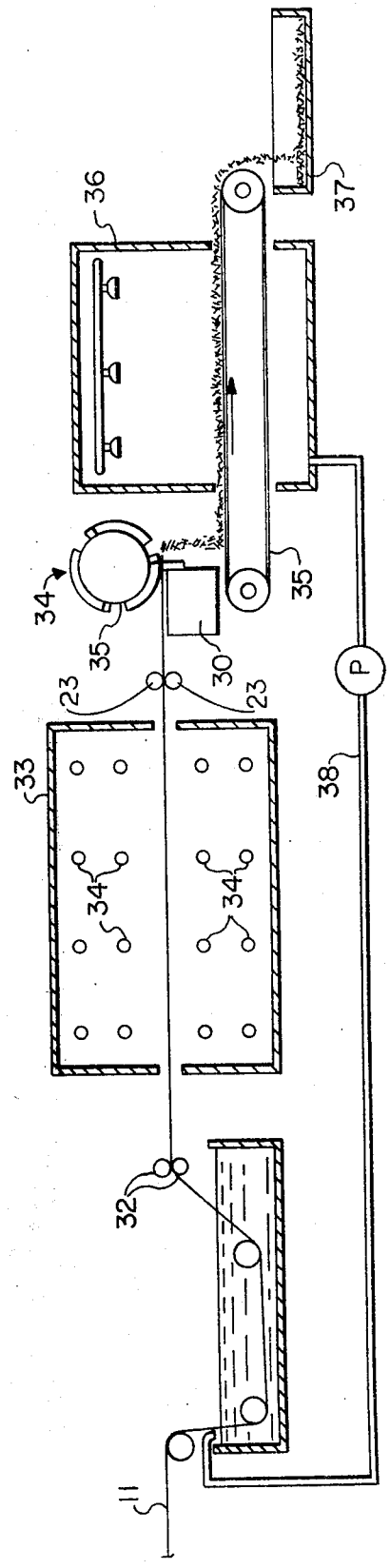
FIG. 3 is a sectional view of another embodiment of the invention.

FIG. 3 illustrates another embodiment of the invention. In this modification, the ribbon is stiffened by freezing it with ice and then cutting the frozen ribbon. Here Stations A and B are the same as in FIG. 1. After the ribbon 11 leaves target 9 it is immersed in water in tank 31 and passes through pinch rolls 32 where it is lightly squeezed to remove excess water. The ribbon then passes through a freezing chamber 33 having freezing coils 34, where the temperature is reduced below 32°F. to freeze the water in the ribbon into ice. The ice-stiffened ribbon leaves the freezing chamber and enters into a cutter station having a cutter means 34 similar to that in FIGS. 1 and 2. The cut sections of ribbon may be caught in a bin and then heated to melt the ice and remove the water, thereby separating the individual cut fibers. Alternatively, as shown in the drawing, the cut ribbon sections may be allowed to drop onto a moving belt 35 and pass through a heating chamber 36 where the ice is melted and the ribbon dried. Cut fibers are removed from the end of the belt into bin 37. The melted ice is recycled back to tank 31 via line 38.

A further modification is shown schematically in FIG. 4. Here the stiffening of the ribbon is accomplished by means of a venturi and is advantageous in that no liquids are employed for stiffening, resulting in an overall simpler operation. This method has been employed in cutting fibers to relatively long lengths, but may be adapted for short lengths as well, such as staple length textile fibers.

In this modification, Stations A and B are the same as in FIG. 1 except that for the modification in FIG. 4, Stations A & B do not utilize any water. The ribbon leaves target 9 and is led via feed rolls into the throat of a venturi 40 at its horizontal axis. Air at a high velocity is introduced at the narrow end of 40 via air ducts 41 above and below ribbon 11. The pressure drop acts to rigidify the ribbon sufficiently so that it can be cut by the rotating knife.

Spaced adjacent the wide end of the venturi is the cutter means 42 similar to cutter means 24 in FIG. 1. The cut fibers, which in this case are dry and separated, are collected in bin 43. In another embodiment of the invention, crimp may be imparted to the ribbon of filaments or wires by modifying feed rolls 23. Rolls 23 may gear crimp the ribbon 11 or a separate set of rolls (not shown) may be used adjacent rolls 23 to impart the crimp to the ribbon.

From the above description, it is apparent that the present invention includes the formation of precision cut predetermined lengths of metal fibers from metal fiber tow, and to apparatus for making such fiber lengths.

I claim:

1. A method for forming cut lengths of metal fibers from a metal filament tow wherein the filaments range in diameter from about 0.5 to 150 microns, comprising the steps of:
   a. moistening each of a plurality of spools of metal filament tow with water;
   b. unwinding a tow band from each of the spools, said tow band being loose and permeable;
   c. laying up said tow bands in the form of a ribbon;
   d. stiffening said ribbon into a flat, rigid band; and
   e. cutting said stiffened ribbon to desired lengths with a shearing cutting action that prevents cold welding or deformation of the ends when cut.

2. The method of claim 1 wherein the said tow band has less than one twist/inch.

3. The method of claim 1 comprising treating the ribbon with a binder to stiffen it.

4. The method of claim 3 comprising impregnating the ribbon with water and then passing it through a freezing zone whereby it is rigidified.

5. The method of claim 3 wherein the binder employed is in the form of a solution of the binder composition.

6. The method of claim 5 wherein the binder employed is a water solution of PVA.

7. The method of claim 6 comprising immersing the ribbon in a water solution of PVA, removing any excess solution, and drying and curing the ribbon.

8. The method of claim 3 comprising washing said cut lengths of ribbons with a solvent for the binder whereby the latter is removed, and separating the individual metal fibers.

9. The method of claim 7 comprising washing said ribbon in hot water to dissolve the PVA and removing it from the ribbon, and separating the individual metal fibers.

10. The method of claim 9 comprising separating the aqueous solution of PVA, removing the water therefrom and recovering PVA for use in the process.

11. The method of claim 3 wherein the ribbon thickness is less than 0.020 inches.

12. The method of claim 11 wherein the ribbon thickness is from 0.012 to 0.018 inches.

13. The method of claim 9 wherein the ribbon thickness is less than 0.020 inches.

14. The method of claim 13 wherein the ribbon thickness is from 0.012 to 0.018 inches.

15. An apparatus for producing precision cut lengths of metal fibers having a diameter ranging from about 0.5 to about 150 microns which comprises:
   a. a multispool creel containing spools of metal fibers in tow form;
   b. means to wet the spools with water;
   c. guiding means to guide tow bands unwound from the spools to a targeting section;
   d. means in the targeting section to lay up said tow bands into a continuous ribbon;
   e. guiding means to pass the ribbon into a means for stiffening the ribbon into a flat, rigid band;
   f. guiding means for passing said stiffened ribbon to a precision shearing action cutting means whereby the ribbon is cut to precision lengths; and
   g. means to prevent cold welding or deformation of the ends of the fibers when sheared, thereby enabling total individual fiber separation.

16. The apparatus of claim 15 wherein the cutting means comprises at least one rotating helical knife coacting with a stationary knife.

17. The apparatus of claim 16 wherein the means for stiffening the ribbon comprises a tank, a liquid binder in said tank, and means for solidifying the binder on the ribbon.

18. Apparatus of claim 17 wherein the binder is a water solution of PVA, means for guiding the ribbon through the PVA solution in the tank, pressure means for removing an excess of PVA solution from the ribbon, heating means for drying and curing the PVA treated ribbon to form a ribbon stiffened with PVA sizing or binder.

19. The apparatus of claim 15 wherein the means for stiffening the ribbon comprises a tank, water in said tank, means for guiding the ribbon through the water in said tank, means for removing an excess of water from the ribbon, means for guiding the ribbon into a freezing zone wherein water retained in the ribbon is frozen to ice thereby stiffening the ribbon.

20. The apparatus of claim 18 wherein the cut ribbons are passed to a washing zone for washing out the PVA, and thence to a drying chamber.

21. The apparatus of claim 19 wherein the cut ribbons are passed to a heating zone for melting the ice and drying the cut fibers.

22. The apparatus of claim 19 wherein the cutting means comprises at least one rotating helical knife coacting with a stationary knife.

23. The apparatus of claim 21 wherein the cutting means comprises at least one rotating helical knife coacting with a stationary knife.

24. An apparatus for producing precision lengths of textile metal fibers having a diameter ranging from about 0.5 microns to about 150 microns which comprises:
   a. a multispool creel containing spools of textile metal filaments in tow form;
   b. means to wet the spools with water;
   c. means to guide tow bands unwound from the spools through a guide section into the form of a continuous ribbon;
   d. means for stiffening the ribbon into a flat, rigid band;
   e. means for passing said stiffened ribbon through a precision shearing action cutting means whereby the ribbon is cut to precision lengths; and
   f. means to prevent cold welding or deformation of the ends when sheared so as to permit total individual fiber separation.

25. An apparatus for producing precision cut lengths of textile metal fibers each having a diameter ranging from about 0.5 microns to about 150 microns which comprises:

a. a multispool creel containing spools of textile metal filaments in tow form;
b. means for forming unwound tow bands into a continuous ribbon;
c. means for stiffening the ribbon by passing it axially through a venturi, said ribbon entering at the narrow end of the venturi and exiting at the large end of the venturi;
d. a fluid stream injected into the venturi at its narrow end in the direction of the ribbon movement whereby said ribbon is stiffened into a flat, stable band;
e. means for cutting said stiffened ribbon into precision lengths of fiber; and
f. means to prevent cold welding or deformation of the ends when sheared so as to permit ultimate total fiber separation.

26. An apparatus for producing precision cut lengths of metal fibers, each fiber having a diameter ranging from about 0.5 microns to about 150 microns, which comprises:
   a. a multispool creel containing spools of metal fibers in tow form;
   b. guiding means to guide tow bands unwound from the spools to a targeting section;
   c. means in the targeting section to lay up said tow bands into a continuous ribbon;
   d. guiding means to pass the ribbon into a means for stiffening the ribbon into a flat, stable band;
   e. guiding means for passing said stiffened ribbon to a precision shearing action cutting means whereby the ribbon is cut to precision lengths; and
   f. means to prevent cold welding or deformation of the ends when sheared so as to permit total individual fiber separation.

27. The apparatus of claim 26 wherein the means for stiffening the ribbon comprises a venturi, means for passing the ribbon axially through the venturi, said ribbon entering at the narrow end of the venturi, a gas stream injected into said venturi at its narrow end in the direction of ribbon movement, whereby said ribbon is stiffened.

28. The apparatus of claim 27 wherein the cutting means comprises at least one rotating helical knife coacting with a stationary knife.

29. A method of forming cut lengths of metal filaments or wires wherein the fibers or wires have a diameter from about 0.5 to about 150 microns comprising the steps of:
   a. providing a plurality of filaments on spools;
   b. unwinding the filaments to form tow bands, the bands being loose and permeable;
   c. laying up the tow bands in the form of a ribbon;
   d. stiffening the ribbon into a flat, rigid band;
   e. cutting the stiffened ribbon into preselected lengths with a shearing cutting action; and
   f. the step of preventing cold welding or deformation of the ends when cutting so as to permit total individual fiber separation.

30. The method of claim 29 further including the step of collecting the cut ribbon.

* * * * *